United States Patent
Horton et al.

(10) Patent No.: US 6,921,786 B2
(45) Date of Patent: Jul. 26, 2005

(54) PATTERN MATERIAL

(75) Inventors: Robert A. Horton, Chesterland, OH (US); April R. Tetlow, Kirtland, OH (US)

(73) Assignee: Precision Metalsmiths, Inc., Cleveland, OH (US)

(*) Notice: Subject to any disclaimer, the term of this patent is extended or adjusted under 35 U.S.C. 154(b) by 0 days.

(21) Appl. No.: 10/675,292

(22) Filed: Sep. 30, 2003

(65) Prior Publication Data

US 2005/0070650 A1 Mar. 31, 2005

(51) Int. Cl.$^7$ .............................................. C08L 91/06
(52) U.S. Cl. .................. 524/275; 524/300; 524/322; 524/365; 106/38.24; 106/38.25; 106/38.7; 106/38.8
(58) Field of Search ................... 524/275, 300, 524/322, 365; 106/38.25, 38.7, 38.8, 38.24

(56) References Cited

U.S. PATENT DOCUMENTS

| 3,296,006 A | 1/1967 | Horton ....................... 106/38.7 |
| 4,064,083 A | 12/1977 | Horton et al. ............ 106/38.25 |

*Primary Examiner*—Peter D. Mulcahy
(74) *Attorney, Agent, or Firm*—Pearne & Gordon LLP

(57) ABSTRACT

An expendable and machinable pattern material capable of being cast in large blocks without shrinkage and machined to a casting shape useful in the lost pattern process of investment casting, the material consisting essentially of ethylene-vinyl resin, fatty acid ketone, and fatty acid.

1 Claim, No Drawings

PATTERN MATERIAL

The present invention relates generally to the art of investment casting by the "lost pattern" process, and more specifically to new and improved machinable and expendable pattern materials adapted for use in the lost pattern process of investment casting.

In the lost pattern process of investment casting, solid investment molds and ceramic shell molds are made using patterns which are replicas of the parts to be cast in metal. Bulk or solid investment molds are prepared by placing an assembly of patterns in a flask and filling the flask with a refractory investment slurry which is allowed to harden to form the mold. Ceramic shell molds are prepared by coating a pattern assembly with a refractory slurry, sanding or stuccoing the slurry coating while wet with coarse refractory material, and allowing the coating to harden to form a thin layer of ceramic material having refractory particles embedded in the surface. After each ceramic layer is sufficiently hard and dry, the steps of coating, stuccoing and drying are repeated until a refractory shell having a desired thickness has been built up around the patterns. The patterns used to make the molds are formed from an expendable material which can be melted, as by heating in a furnace, oven or autoclave, to remove them from the finished mold and thereby form the casting cavities.

When only a small number of castings are required, as in prototype work which may involve the production of a few castings for experimental purposes, it is usually faster and more economical to produce the patterns by machining blocks of pattern material to the desired casting shapes instead of using metal production tooling. U.S. Pat. No. 3,296,006, issued Jan. 3, 1967, discloses an expendable pattern material having excellent machining characteristics, the pattern material being comprised of a fatty acid ketone and ethyl cellulose. While patterns made with this material have excellent machinability, it was discovered that the ethyl cellulose-fatty acid ketone composition could cause mold cracking problems in certain situations which limited the use of the material.

U.S. Pat. No. 4,064,083 issued Dec. 20, 1977, the disclosure of which is incorporated by reference, is an improvement on the fatty acid ketone/ethyl cellulose composition. This patent discloses a pattern material comprising (by weight) 45% laurone, 45% stearone, and 10% ethylene-vinyl acetate resin. The fatty acid ketone/ethylene-vinyl resin material has about the same machinability as the fatty acid ketone/ethyl cellulose composition, but has the advantage of reducing or eliminating the mold cracking problems that sometimes occurred during the pattern removal operation. As a result, fatty acid ketone/ethylene-vinyl resin compositions have been the material of choice for many applications where investment casting patterns are to be made by machining. In spite of the successful use of the fatty acid ketone/ethylene-vinyl resin compositions, changing circumstances have made it desirable to have a successor material that will handle certain problems encountered in recent practices of investment casting.

One such problem has resulted from a strong and continuous trend to produce larger investment castings that require correspondingly larger patterns than used in the past. Efforts to produce larger and larger prototype patterns by machining serve to highlight a significant limitation of the materials disclosed in U.S. Pat. No. 4,064,083. It was found to be very difficult, and in many cases highly impractical, to cast the material in large, machinable blocks without excessive internal shrinkage and sometimes excessive cavitation or dishing in the outer side walls. Occasionally, cracking of entire large blocks of pattern material has occurred.

SUMMARY OF THE INVENTION

The primary purpose of the present invention is to provide a new and improved expendable and machinable pattern material for the lost pattern process of investment casting which can be successfully cast into large blocks without excessive internal shrinkage and outer side wall cavitations, while maintaining the excellent machining characteristics of the fatty acid ketone/ethylene-vinyl resin materials and the capability of being successfully removed from investment molds by conventional procedures such as heating and autoclaving.

The above-referenced U.S. Pat. No. 4,064,083 discloses that "The addition of compatible waxes and resins and combustible solid fillers to the basic vinyl-resin-ketone system tends to detract from the excellent machinability of the new composition of the invention." The present invention is based on the discovery that one specific class of waxes can be added to the fatty acid ketone/vinyl-resin compositions without detracting from their desirable machinability, and that this specific class of waxes produces an enormous improvement in the ease and ability to cast large blocks of the material without shrinkage or cavitation. This class of waxes comprise aliphatic acids with melting points above room temperature, generally referred to as fatty acids. Examples of useful fatty acids include, but are not limited to, lauric, myristic, palmitic, stearic and behenic acids and their substituted, branched or other derivatives which exhibit equivalent properties. In accordance with the present invention, these waxes are combined in appropriate compositions with fatty acid ketones and ethylene-vinyl resins.

Accordingly, the invention is an expendable and machinable pattern material capable of being cast in large blocks and machined to desired casting shapes, the material consisting essentially of ethylene-vinyl resin, fatty acid ketone, and fatty acid.

Useful ketones include laurone, myristone, palmitone, stearone, behenone, and the like, just as disclosed in U.S. Pat. No. 4,064,083. The only suitable ketone of this class which is commercially available at present is stearone (distearyl ketone). The preferred composition disclosed in U.S. Pat. No. 4,064,083 contains equal amounts of laurone and stearone. Such a combination, while technically excellent, is not economically viable at present due to the exorbitant cost of laurone. Therefore, an additional object of this invention is to provide an equivalent machinable and expendable material using stearone as the sole ketone.

Suitable ethylene-vinyl resins include ethylene/vinyl acetate copolymer, terpolymers of ethylene, vinyl acetate and an organic acid, and ethylene ethyl acrylate copolymers.

One preferred composition of the invention consists essentially of the following in amounts by weight:

5–20% ethylene-vinyl resin
25–75% fatty acid
25–75% fatty acid ketone
0–20% other compatible ingredients.

Compatible materials can be one or more members selected from the class of waxes, combustible solid fillers, and resins other than ethylene-vinyl polymer.

A more specific composition range contemplated by the present invention is:

- 8–15% ethylene-vinyl acetate resin
- 38–62% fatty acid
- 38–62% fatty acid ketone

DESCRIPTION OF PREFERRED EMBODIMENTS

In the following embodiments, all percentages are percentages by weight.

EXAMPLE 1

- 10% ethylene vinyl acetate copolymer comprised of 18% vinyl acetate and characterized by a ring and ball softening point of 199° C. (390° F.) and melt index of 2.5.
- 38% commercial fatty acid blend comprising 65% stearic acid, 30% palmitic acid, 2.5% margaric acid, 2% myristic acid, and 0.5% pentadecanoic acid.
- 52% stearone.

The foregoing is a preferred composition and is formulated with stearone as the sole ketone. The composition was easily cast in blocks almost three times the volume of the largest ones produced with considerable difficulty with the compositions of U.S. Pat. No. 4,064,083. It is believed possible to form even larger blocks with larger molds. The machinability was equivalent to that of the materials disclosed in U.S. Pat. No. 4,064,083, and its dewaxability by heating was considered somewhat better.

EXAMPLES II AND III

| Description | Example II | Example III |
| --- | --- | --- |
| Ethylene-vinyl acetate of Example I | 10% | 10% |
| Fatty acid blend of Example I | 44% | 45% |
| Laurone | 46% | — |
| 10-Nonadecanone | — | 45% |

Examples II and III are compositions which are very suitable for use and illustrate the use of additional ketones in place of stearone. Because of current economics, the compositions of Examples II and III are not preferred.

Tests that were conducted prove that the ability to pour and solidify large blocks of material successfully without shrinkage is markedly improved by blending a fatty acid with the ketone, and it was found that a ratio 1:1 of fatty acid to ketone works well almost all of the time. Nevertheless, the best ratio for any specific combination depends on the specific acids and ketones used. The preferred composition of Example I shows a ratio favoring more ketone (stearone), but other combinations can reverse the ratio.

EXAMPLE IV

- 10% terpolymer of ethylene-vinyl acetate (25%) and an organic acid.

Typical properties are ring and ball softening point of 151° C. (304° F.), a melt index of 6 and an acid number in the range of 4–8.

- 38% fatty acid blend as in Example I
- 52% stearone.

EXAMPLE V

- 10% ethylene-vinyl acetate copolymer as in Example I.
- 44% behenic acid.
- 46% stearone.

EXAMPLE VI

- 8% ethylene-vinyl acetate copolymer as in Example I.
- 30% fatty acid blend as in Example I.
- 42% stearone.
- 15% paraffin wax, melting point 160° F.
- 5% microcrystalline wax, melting point 170° F.

The composition of this Example had fair machinability, but was considerably inferior to machinability of the compositions of Examples I–V. In general, ingredients such as waxes other than fatty acid, solid fillers or resins other than ethylene-vinyl, while reducing machinability, are included in compositions for cost savings when the lower level of machinability is acceptable.

EXAMPLE VII

- 18% ethylene-vinyl acetate resin as in Example I.
- 35% fatty acid blend as in Example I.
- 47% stearone.

The optimum amount of ethylene-vinyl resin in the compositions of the invention is frequently around 10%. Higher amounts increase the cost, but may be needed when very fragile shapes are to be machined from a cast block of material. Higher amounts of ethylene-vinyl resin also may be used when the material is intended for purposes other than making casting patterns. There is a tendency for materials containing higher amounts of ethylene-vinyl resin to cause mold cracking during the pattern removal operation, but this is not a problem when the material is being used to make small patterns.

Many modifications and variations of the invention will be apparent to those skilled in the art in light of the foregoing detailed disclosure. Therefore, it is to be understood that within the scope of the appended claims, the invention can be practiced otherwise than as specifically described.

What is claimed is:

1. An expendable and machinable pattern material capable of being cast and in large blocks and machined to a casting shape useful in the lost pattern process of investment casting, said material consisting essentially of ethylene-vinyl resin, at least 1 fatty acid ketone and at least one fatty acid, the ethylene-vinyl, resin, fatty acid, and fatty acid ketone being present in amounts by weight based on the total weight of the material as follows:

- 8–15% of ethylene-vinyl resin,
- 38–62% of at least one fatty acid,
- 38–62% of at least one fatty acid ketone.

* * * * *